UNITED STATES PATENT OFFICE.

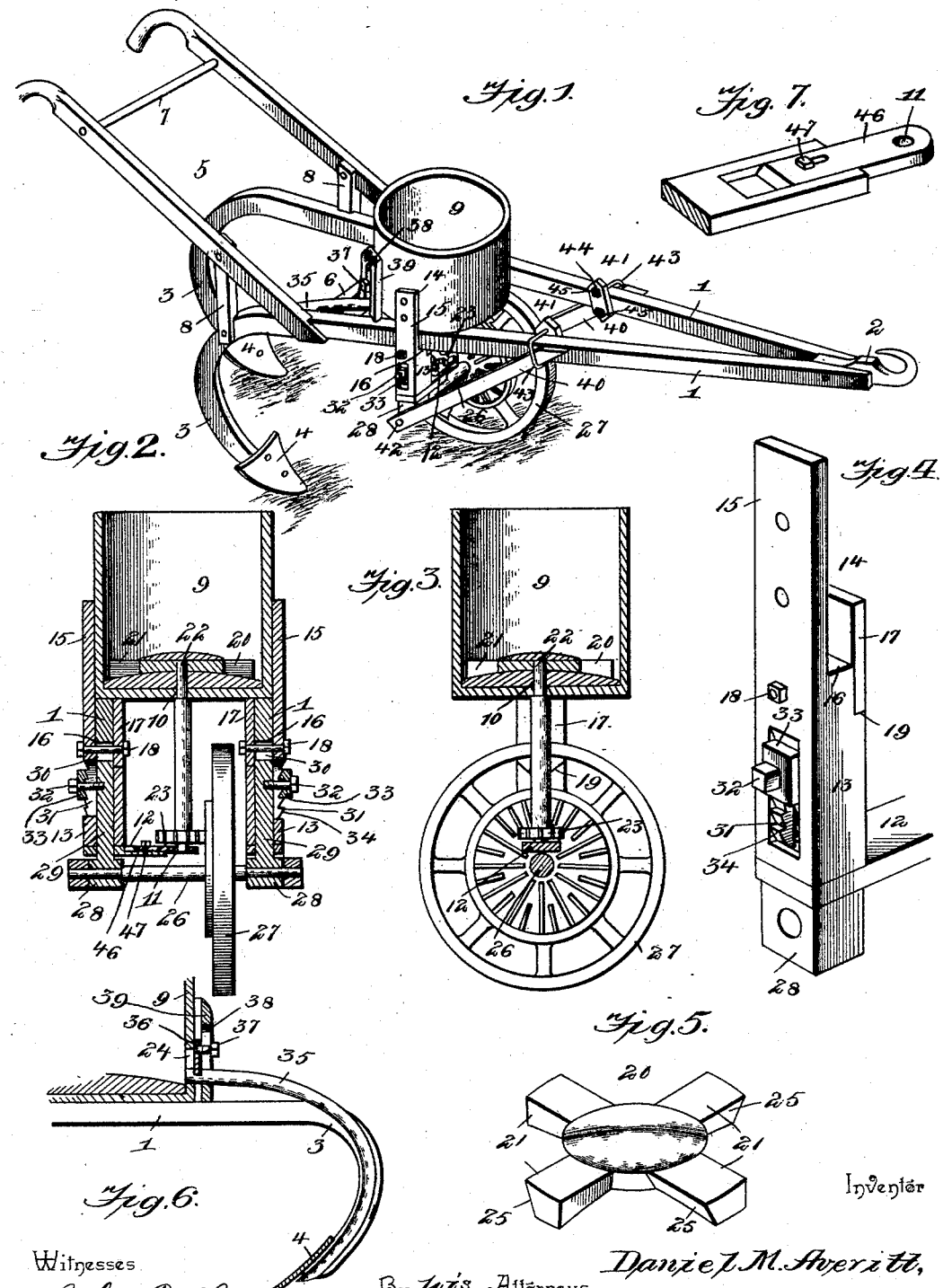

DANIEL MITCHELL AVERITT, OF BEDFORD, KENTUCKY.

FERTILIZER-DISTRIBUTER.

SPECIFICATION forming part of Letters Patent No. 524,455, dated August 14, 1894.

Application filed March 24, 1894. Serial No. 504,973. (No model.)

*To all whom it may concern:*

Be it known that I, DANIEL MITCHELL AVERITT, a citizen of the United States, residing at Bedford, in the county of Trimble and State of Kentucky, have invented a new and useful Fertilizer-Distributer, of which the following is a specification.

My invention relates to a fertilizer distributer for double shovel plows, and it has for its object to provide a simple, inexpensive and automatic device adapted to be attached to double shovel plows of the ordinary construction, whereby the fertilizer is deposited in the furrow in rear of and close to one of the shovels and is covered by the soil as the latter falls back into the furrow to facilitate the simultaneous agitation and fertilizing of the soil adjacent to vegetation, and furthermore, to provide means for adjusting the parts to suit deep or shallow plowing and to feed the fertilizer at any desired rate.

Further objects and advantages of the invention will appear in the following description, and the novel features thereof will be particularly pointed out in the appended claims.

In the drawings: Figure 1 is a perspective view of the attachment embodying my invention applied in the operative position to a double shovel plow. Fig. 2 is a vertical transverse section of the same parallel with and in the plane of the axis of the driving-shaft. Fig. 3 is a longitudinal section at right-angles to the axis of the driving-shaft. Fig. 4 is a detail view in perspective of one of the hangers and the clamp by which it is secured to a beam of the plow frame. Fig. 5 is a detail view of the rotary agitator which is arranged in the fertilizer box to feed the contents of the latter into the feed-tube or conductor. Fig. 6 is a detail view of the slide and attachments, whereby the discharge of the fertilizer is controlled. Fig. 7 is a detail view of the means for adjusting the parts to throw the distributing device out of operation.

Similar numerals of reference indicate corresponding parts in all the figures of the drawings.

The main-frame of the plow consists of the rearwardly divergent beams 1, which are connected at their front ends and support the clevis-hook 2 and terminate at their ends in the downwardly curved shovel-standards 3 carrying the shovels 4, and the handles 5, which are secured to the beams adjacent to the cross-bar 6, are connected near their upper ends by the round 7, and are braced by the vertical pieces 8 rising from the beams and secured thereto at intermediate points.

9 represents a cylindrical receptacle or hopper supported by the beams 1 and provided in its bottom or floor with a bearing 10 which is aligned vertically with a similar bearing 11 formed in a subjacent horizontal arm 12 which projects inward from the lower end of one of the hangers 13. These hangers are provided at their upper ends with clamps 14 whereby they are secured to the beams 1 at opposite sides of the receptacle or hopper, and said clamps comprise the outer fixed jaws 15 which may be formed integral with the body-portions of the hangers and which rise above shoulders 16 adapted to bear against the under sides of the beams of the plow frame, and the movable jaws 17 which are secured in place by means of the clamping-bolts 18 and are provided with V-shaped or tapered lower ends which fit in correspondingly shaped seats 19 in the inner sides of the hangers. The outer or fixed jaws of the clamps project above the plane of the upper sides of the beams 1 and are secured to the sides of the receptacle or hopper 9, whereby the latter is held firmly in place upon the framework.

The rotary agitator 20, having the radial arms 21, is arranged in the receptacle or hopper in contact with its floor, and it is provided with a depending spindle 22 which is mounted in the above-described bearings 10 and 11. A spur-wheel 23 is secured to this spindle above and resting upon the upper side of the horizontal arm 12. The floor of the receptacle or hopper is preferably rounded or convexed, as shown, and the under side of the agitator is correspondingly concaved to fit the convexity of the floor, and the radial arms 21 are beveled on their front under sides whereby they are adapted to press the fertilizer downward and toward the outlet 24 in the side of the receptacle. The beveled surfaces of the arms are shown at 25.

The driving-shaft 26 is mounted in opposite bearings at the lower ends of the hangers, and fixed thereto with its inner surface contiguous to the periphery of the spur-wheel 23 is a driving-wheel 27 which is adapted to travel upon the surface of the ground. The inner surface of the driving-wheel is provided with a plurality of concentric series of crown-gear teeth, either series being adapted to engage with the teeth of the said spur-wheel according to the position of the driving shaft and wheel which are vertically adjustable by means of the bearings 28 in which the ends of the shaft are mounted. These bearings are provided with stems 29 which fit adjustably in vertical sockets 30 in the lower ends of the hangers 13, and projecting laterally from these stems and through vertical slots 31 in the sides of the hangers are the set-screws 32 which carry clamping-blocks 33 having serrated inner faces to engage serrated surfaces upon opposite sides of the slots 31. These serrated surfaces upon the outer sides of the hangers are indicated at 34, and the serrations upon the inner surfaces of the clamping-blocks agree therewith and engage the same firmly when the set-screws are tightened.

35 represents a fertilizer tube or conductor which communicates with the feed-opening in the side of the receptacle or hopper and passing down adjacent to one of the beams of the plow-frame terminates in rear of and adjacent to one of the shovels; preferably that shovel which is in advance. In this way the fertilizer is deposited in the furrow before the latter is filled and therefore is covered and is brought into proper and effective proximity to the plants.

I preferably employ a controlling slide 36 in connection with the feed-opening in the receptacle or hopper, whereby such opening may be closed when the device is not in use and whereby the extent of opening may be regulated according to the quantity of the fertilizer desired and the speed of rotation of the agitator, and this slide is provided with a set-screw 37 fitting in a slot 38 in the standard 39 whereby it may be locked at any desired adjustment.

The shaft of the driving-wheel is extended laterally beyond the outer sides of the hangers and connected to these extensions are the rear ends of the inclined draft-braces 40 which are connected at their front upper ends to the beams 1 by means of clamps or clips 41. The rear ends of the said braces are perforated, as shown at 42, to receive the extensions of the shaft, and the clips 41 comprise the loops 43 which embrace the beams 1, and the clip-plates 44 having perforations to receive the extremities of the loops which are engaged by nuts 45.

The operation of the above mechanism will be readily understood from the foregoing description in view of the prior use of devices designed for analogous purposes, and it will be seen that in addition to the means for facilitating the attachment of the distributer to an ordinary plow frame, and the means for adjusting the various parts to secure accurate co-operation therebetween both in deep and shallow plowing and to secure the discharge of the desired quantity of the fertilizer, I have provided a construction which insures the deposit of the fertilizer in rear of the advance shovel and close enough thereto to cause it to be covered immediately and without a subsequent manipulation of the soil, as by running a second or covering furrow.

It will be understood, furthermore, that various changes in the form, proportion, and minor details of construction may be resorted to without departing from the spirit or sacrificing any of the advantages of the invention.

In order to provide for throwing the distributing devices out of gear, whereby the plow may be moved without causing the rotation of the agitator, I arrange the bearing 11 for the lower end of the spindle 22 in an adjustable member or part 46 of the horizontal arm 12, and a set-screw 47 to lock said adjustable member or part in the desired position. This adjustable member or part may be moved from the plane of the gear-wheel 27 sufficiently to disengage the pinion 23 therefrom, and thus allow the agitator to remain at rest.

Having thus described my invention, I claim—

1. A fertilizer attachment for plows, having hangers provided at their upper ends with clamps consisting of fixed and movable jaws and means for holding the same in engagement with beams of the plow-frame, a receptacle or hopper secured to upwardly extended portions of the fixed jaws of the clamp and provided with a feed-opening communicating with a conductor, a driving-wheel having its shaft mounted in bearings at the lower ends of the hangers, and an agitator arranged in the receptacle or hopper and operatively connected to said driving-wheel, substantially as specified.

2. A fertilizer attachment for plows, having hangers and means for attachment to the beams of a plow-frame, a receptacle or hopper supported by extensions of the hangers and provided with a suitable outlet, vertically adjustable bearings attached to the lower ends of the hangers, means for securing said bearings at the desired adjustment, a driving-wheel having its shaft mounted in said bearings, an agitator arranged in the receptacle or hopper, and connections between the agitator and the driving-wheel, substantially as specified.

3. A fertilizer attachment for plows, having hangers and means for securing the same to the beams of a plow-frame, a receptacle or hopper supported by said hangers, bearings provided with stems which are fitted slidably in vertical sockets in the lower ends of the hangers, clamping-blocks having serrated faces to engage serrated surfaces upon the hangers, set-screws extending through said blocks and vertical slots in the hangers and engaging the stems of the bearings, a driving wheel having its shaft mounted in said bearings, and an agitator arranged in the receptacle or hopper and operatively connected to the driving-wheel, substantially as specified.

4. A fertilizer attachment for plows, having hangers and means for securing the same to the beams of a plow-frame, a receptacle or hopper, bearings at the lower ends of the hangers, means for adjusting said bearings vertically and locking them in their adjusted positions, a driving-wheel having its shaft mounted in said bearings and provided with a plurality of concentric series of crown gear teeth, an agitator arranged in the receptacle or hopper and having its spindle mounted in vertically aligned bearings in the floor of the receptacle and an arm projecting from the lower end of one of the hangers, and a spur-gear fixed to the spindle of the agitator and meshing with one of the series of gear teeth upon the driving-wheel, substantially as specified.

5. In a fertilizer distributer, the combination with a receptacle or hopper, means for conveying the fertilizer therefrom, a supporting framework, a ground-wheel provided with gear teeth, and an agitator arranged in the receptacle or hopper, of a horizontal arm carried by the framework and having an adjustable part or member, means for locking said member at the desired adjustment, a spindle for said agitator mounted in registering bearings in the bottom of the receptacle or hopper and in said adjustable part or member of the horizontal arm, and a pinion carried by the spindle to mesh with the gear teeth on said ground-wheel, substantially as specified.

In testimony that I claim the foregoing as my own I have hereto affixed my signature in the presence of two witnesses.

DANIEL MITCHELL AVERITT.

Witnesses:
  HALLIE BARTLETT,
  W. R. LOGAN.